Figure 1:
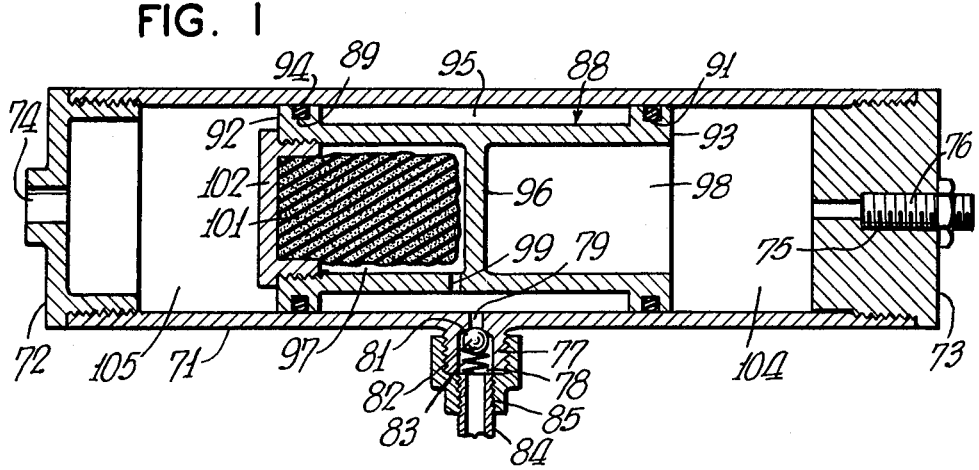

Jan. 25, 1966     J. MERCIER     3,230,977

PISTON ACCUMULATOR

Original Filed Feb. 10, 1953

INVENTOR
*Jean Mercier*
BY
*Dean, Fairbank & Hirsch*
ATTORNEYS

United States Patent Office 3,230,977
Patented Jan. 25, 1966

3,230,977
PISTON ACCUMULATOR
Jean Mercier, 1185 Park Ave., New York, N.Y.
Application Dec. 18, 1962, Ser. No. 245,536, now Patent No. 3,142,318, dated July 28, 1964, which is a division of application Ser. No. 689,223, filed Oct. 9, 1957, now Patent No. 3,074,437, dated Jan. 22, 1963, and application Ser. No. 336,054, filed Feb. 10, 1953, now Patent No. 2,817,361, dated Dec. 24, 1957. Divided and this application July 14, 1964, Ser. No. 382,446
4 Claims. (Cl. 138—31)

This application is a division of copending application Serial No. 245,536, filed December 18, 1962 now Patent No. 3,142,318, which was a division of application Serial No. 689,223 (now Patent No. 3,074,437) and of application Serial No. 336,054 (now Patent No. 2,817,361).

This invention relates to piston type pressure vessels such as pressure accumulators or the like and more particularly to the piston seal between the gas and liquid chambers of the pressure vessel.

As conducive to an understanding of the invention, it is noted that unless a dependable seal is provided for the piston between the gas and liquid chambers of a piston type pressure vessel, the resultant leakage of liquid into the gas chamber necessitates frequent servicing of the device for draining of such liquid and the leakage of gas into the liquid chamber and its subsequent entry into the hydraulic system might be detrimental to the proper functioning of the unit to be operated by the device such as for example the hydraulic brakes of a truck which would not operate dependably if a gas bubble entered the unit.

Where a single O ring type seal is used for the piston, the effectiveness of such seal is poor when the pressure on both sides of the piston is identical, as is usually the case in piston type pressure vessels, for such seal only operates effectively when there is a greater pressure on one side than the other which will force the O ring toward the low pressure side into the space between the piston and the adjacent wall of the device to create an effective seal.

Where two O rings are used on a piston on each side of an annular groove therein, and the annular groove is vented to atmosphere in an attempt to secure a differential between the pressure on opposite sides of each of the rings, as pressure vessels are generally used under relatively high pressures, the differential is often so great as to cause excessive distortion of the O rings with resultant extrusion between the piston and the wall of the device, so that upon sliding movement of the piston in use of the device, the O rings will rapidly break down with resultant failure of the seal and leakage between the liquid and gas chambers.

Accordingly, it is among the objects of the invention to provide a piston type pressure vessel which will function without leakage between the gas and liquid chambers and without likelihood of injury to the resilient sealing means between the piston and the wall of the device even after long periods of use, which device is relatively simple in construction having but few parts, none of which are delicate or likely to become deranged and which may readily be assembled and disassembled for cleaning and maintenance.

Another object is to provide a pressure device of the above type which will permit a predetermined differential between the pressure on opposed sides of the resilient sealing means, which pressure during normal operation of the device is considerably less than the difference between the atmospheric pressure and the pressure in the liquid and gas chambers.

Another object is to provide a pressure device of the above type which upon attainment of a predetermined pressure on the inner sides of the resilient sealing means will permit discharge of fluid into the liquid chamber of the device to retain such pressure at no greater than the predetermined amount.

According to the broad aspect of the invention, a pair of resilient seals encompasses the periphery of a piston type pressure vessel and are positioned on each side respectively of an annular groove associated with the periphery of said piston. Valve means are provided, operatively connected to such annular groove and adapted to discharge fluid therefrom when a predetermined pressure has been attained therein.

Figure 2:
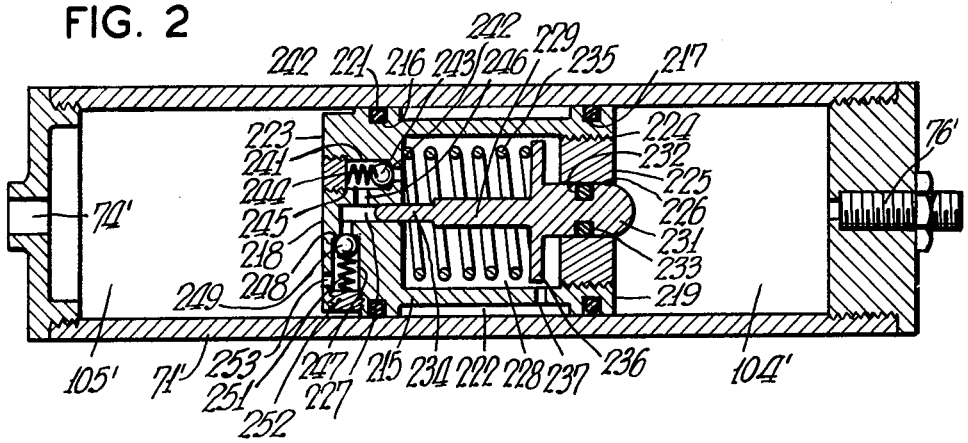

In the accompanying drawings in which are shown one or more of various possible embodiments of the several features of the invention, FIGS. 1 and 2 are longitudinal sectional views of different illustrative embodiments of the invention.

Referring now to the drawings, the embodiment shown in FIG. 1 desirably comprises a substantially cylindrical sleeve 71 having plugs 72 and 73 screwed in each end thereof, said plugs each having a port 74 and 75 therethrough respectively, the port 75 desirably having a gas valve 76 threaded therein. The sleeve 71 desirably has a cylindrical boss 77 extending radially therefrom midway between its ends. The boss 77 desirably has a bore 78 therethrough of reduced diameter at its inner end as at 79 defining a passageway leading into the sleeve and forming a shoulder 81. The passageway 79 is desirably controlled by a valve which in the illustrative embodiment herein may comprise a ball 82 normally urged against the shoulder 81 which forms a valve seat, to seal said passageway 79, by means of a coil spring 83 compressed between the ball and the end of an outlet pipe 84 screwed in the bore 85 of a hollow nut 86 threaded on the boss 77. Desirably, as shown, the passageway 79 is positioned on the undersurface of the sleeve 71 for the purpose hereinafter to be described.

Slidably mounted in the sleeve 71, which forms the shell of the pressure vessel, is a piston 88 desirably having a pair of spaced annular grooves 89 and 91 in the outer periphery thereof near the ends 92 and 93 of the piston respectively and an elongated annular groove 95 in its outer periphery extending between said annular grooves 89 and 91, each of said grooves 89 and 91 desirably having a resilient seal therein preferably an O ring 94. The piston 88 which desirably is hollow has a transverse central wall 96 defining chambers 97 and 98 on each side, the chamber 97 being in communication with annular groove 95 by means of a transverse bore 99. A secondary pressure vessel is desirably provided defined by the chamber 97. In the illustrative embodiment such secondary pressure vessel may comprise a cylindrical block 101 of foam rubber, having one end affixed in a plug 102 threaded into the open end of chamber 97 with its other end extending to nearly the wall 96.

Desirably, the length of the piston 88 is such that in either of its extreme positions, i.e., with its end 92 against plug 72 or its end 93 against plug 73, the passageway 79 in shell 71 will still lead into annular groove 95.

In the operation of the device shown in FIG. 1, gas under pressure is first forced through valve 76 to charge chamber 104. As a result, the piston will move to the left. Fluid under pressure greater than that of the gas in chamber 104 is forced through port 74 into chamber 105 to move the piston 88 to the right further to compress the gas in chamber 104. The device is then ready for use.

In the present condition of the device, as the gas in annular groove 95 will be substantially only under atmospheric pressure and the gas and fluid in chambers 104 and 105 respectively will be under a considerably greater pressure, a differential will be provided between the pressure on opposed sides of the O rings 94 which will force the O rings toward the low pressure side into the space between the piston and adjacent wall of the device to provide an effective seal. However, the pressure differential is so great that unless reduced rapidly, the movement of the piston in the use of the pressure device would cause extrusion of the O rings and in addition continuous sliding movement of the piston under such conditions would cause rapid deterioration of the O rings and resultant breakdown of the seals.

This pressure differential is reduced by a few operations of the pressure device, for each time fluid is permitted to escape from port 74 during normal use, the piston 88 will move slightly to the left providing a pumping action which will force a small quantity of fluid from chamber 105 past O ring 94 into annular groove 95, through port 99 into chamber 97 to compress the foam rubber block 101, and increase the pressure on the gas in annular groove 95 and in chamber 97 which originally was atmospheric. Such pumping action will quickly increase the pressure in annular groove 95 and in chamber 97 to reduce the differential between the pressure on opposed sides of the O rings. When such pressure in chamber 95 has increased to the desired value to be maintained, based on the tension of spring 83, the ball 82 will move off its seat to relieve any further pressure increases.

By reason of the positioning of the bore 78 in the bottom of the sleeve 71, when the ball 82 is moved off its seat, substantially only fluid will be forced from pipe 84 as the gas pocket will tend to remain in the top or upper portion of annular groove 95.

By reason of the pumping action heretofore described, it is apparent that the pressure of the air in annular groove 95 will quickly rise to reduce the differential between the pressure on the opposed sides of the O rings. The construction herein described ensures that a differential pressure will be maintained at all times for effective sealing action as the pressure in the annular groove 95 is relieved by means of the movement of the ball valve 82 to open bore 79 when such pressure has risen to a predetermined amount which is below the minimum pressure under which the fluid in chamber 105 will be maintained during normal use of the device.

Thus, for example, assuming that the pressure of the gas originally charged in chamber 104 is 1,000 p.s.i. and the fluid forced into chamber 105 compresses such air to say 3,000 p.s.i., the spring 83 may be adjusted to exert a force against ball 81 so that it will relieve the pressure in annular groove 95 when the pressure therein rises above 1,000 p.s.i. Thus, since the pressure on the fluid in chamber 105 will not fall to 1,000 p.s.i. until such chamber is substantially empty, a differential pressure no greater than 2,000 p.s.i. will always be provided for dependable sealing action of the O rings, yet such pressure is below that which would cause extrusion of the O rings with the difficulties above pointed out. By reason of the foam rubber block 101, added capacity is provided to insure that the ball valve 81 will unseat at the predetermined pressure.

As a result, a desired differential pressure may be provided which, though sufficient to prevent leakage past the O rings, will not be so great as to cause deformation thereof upon sliding movement of the piston.

The embodiment shown in FIG. 2 desirably utilizes a shell construction substantially identical to that shown in FIG. 1 and corresponding parts have the same reference numerals primed.

In the embodiment shown in FIG. 2, a substantially cylindrical position 215 is slidably mounted in shell 71'. The piston desirably has a pair of spaced annular grooves 216 and 217 near each of its ends 218 and 219 respectively, and an elongated annular groove 222 extending between the annular grooves 216 and 217, a resilient sealing member such as an O ring 221 desirably being positioned in each of said annular grooves 216, 217.

The piston 215 is desirably cup-shaped, having a wall 223 at its end 218 and having an open mouth 224 at its end 219, the mouth 224 being desirably sealed by a threaded plug 225 having an axial bore 226 therethrough desirably longitudinally aligned with an axial elongated cavity 227 extending from the inner surface of wall 223. Positioned in the bore 228 of piston 215 is a rod 229 desirably of enlarged diameter at one end as at 231, said enlarged diameter end 231 being slidable in bore 226 with substantially no transverse play and desirably having an annular groove 232 in which an O ring 233 is positioned to provide a seal between the wall of bore 226 and the outer surface of enlarged portion 231. The other end of rod 229 is of reduced diameter as at 234 and fits snugly in bore 227, yet free to slide therealong, said reduced portion 234 acting as a pump piston in the manner hereinafter to be described.

The reduced portion 234 is normally urged to retracted position in bore 227 by means of a coil spring 235 encompassing rod 229 and compressed between the inner surface of wall 223 and a flange 236 rigid with said rod. Desirably the bore 228 of the piston is in communication with annular groove 222 by means of a radial bore 237.

The end wall 223 of the piston desirably has a bore 241 extending therethrough radially displaced from bore 227 and of reduced diameter at its inner end defining a ball seat 242. A ball 243 in said bore 241 is normally retained against said seat by a coil spring 244 compressed between the ball and a plug 245 threaded into bore 241. Bore 241 is in communication with bore 227 through a radial bore 246 and bore 227 is in communication with a transverse bore 247 in end wall 223, said transverse bore being of reduced diameter at its inner end defining a ball seat 248. A ball 249 in bore 247 is normally retained against its seat by a coil spring 251 compressed between the ball and a plug 252 threaded in the end of the bore 247, a passageway 253 being provided between said bore 247 and the fluid chamber 105'.

In the operation of the embodiment shown in FIG. 2, as in the previous embodiment heretofore described, gas under pressure is forced through valve 76' into chamber 104'. As a result, piston 215 will move to the left. Assuming that the accumulator is to be used under a pressure of 3,000 p.s.i., fluid is forced through inlet port 74' into chamber 105' under greater pressure than that of the gas chamber 104' which is initially, say at 1,000 p.s.i. As a result, the piston 215 will be moved to the right further compressing the gas in chamber 104'. By reason of the ball valve 249, which seals bore 247, no fluid will flow therethrough when the fluid chamber is originally charged.

As the pressure in bore 228 and annular groove 222 is originally atmospheric, by reason of the pressure exerted against the enlarged end 231 of rod 229, such rod will be moved to the left against the tension of coil spring 235.

After a few operations of the device which will discharge fluid from port 74', the successive movements of the piston to the left will provide a pumping action which will force fluid into annular groove 222 and bore 228 to increase the pressure therein, thereby decreasing the differential between the pressure on opposed sides of the O ring. Such movements of the piston will also cause the gas pressure and consequently the fluid pressure in chambers 104' and 105' to be reduced to below the maximum original pressure of 3,000 p.s.i.

When the pressure in the piston bore 228 and in annular groove 222 increases to an amount such that the piston pressure plus the force exerted by spring 235 will overcome the pressure in the gas chamber 104' against end 231 of the rod 229, such rod will move to the right. As a result of the outward movement of end 234 of rod 229 from bore 227, a suction action will be created in bore 227 which will move ball 243 off its seat to draw fluid from the piston bore 228 into said bore 227. As the result of such flow of fluid, the pressure in the piston bore 228 and annular groove 222 will drop so that the pressure in chamber 104' will again move the rod 229 to the left. This will force the fluid in bore 227 through the reduced portion of bore 247 to move ball 249 off its seat for discharge of fluid into the chamber 105'. It is apparent from the foregoing that although the piston pressure is less than that of the fluid pressure in chamber 105', the pumping action will force fluid from the piston bore 228 and groove 222 into the fluid chamber 105'. After such fluid has been discharged, the ball 249 will again seat.

Thus, with each movement of the piston and rise of the piston pressure above a predetermined amount, a pumping action will be provided to eject fluid from the piston bore thereby maintaining a maximum desired differential pressure between opposed sides of the O ring.

With the constructions above described, a maximum differential is provided between the pressure on opposed sides of the O rings to ensure dependable sealing action yet without such distortion of the O ring seals which might cause extrusion thereof with resultant breakdown and failure of the seal.

As many changes could be made in the above constructions, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A pressure vessel comprising a cylinder having a gas inlet port and a fluid port, said cylinder having a transverse opening therethrough substantially midway between its ends, a piston slidably mounted in said cylinder intervening between said ports and defining a gas chamber and a fluid chamber, said piston having a pair of spaced annular grooves in its periphery and a third elongated groove interposed between said pair of said annular grooves, said piston being of length such that in all positions thereof in said cylinder said transverse opening will lead into said elongated annular groove, said piston comprising an elongated sleeve having a wall therein extending thereacross defining two chambers, one being in communication with the gas chamber, a compressible member positioned in the other chamber in said piston, means sealing the open end of said other chamber, said second chamber being in communication with the elongated annular groove, a resilient deformable annular seal in each of said pair of said spaced annular grooves, said seals engaging the inner wall of said cylinder, and valve means connected to said transverse opening to control flow through the latter thereby controlling the pressure in said elongated annular groove, said valve means being adapted to relieve said pressure when it has attained a predetermined value.

2. A pressure device comprising a cylinder having a gas inlet port and a fluid port, a piston slidably mounted in said cylinder intervening between said ports and defining a gas chamber and a fluid chamber, said piston having a pair of spaced annular grooves in its periphery and a third elongated annular groove interposed between said pair of annular grooves, a resilient deformable annular seal in each of said pair of spaced annular grooves, said seals engaging the inner wall of said cylinder, said piston having a chamber therein with a wall at each end exposed in said gas chamber and said fluid chamber respectively, said piston chamber being in communication with said elongated annular groove, said fluid chamber wall having an axial bore extending from the inner surface thereof to nearly the outer surface, a second bore in said fluid chamber wall parallel to said axial bore and radially spaced therefrom, said second bore also extending from the inner surface of said fluid chamber wall to near the outer surface thereof, said second bore being of reduced diameter at its inner end defining a valve seat, a valve member in said second bore, resilient means normally retaining said valve member on said seat, said second bore being in communication with said first bore, a transverse bore in said fluid chamber wall in communication at its inner end with said axial bore near the end thereof, said third bore being of reduced diameter at its inner end defining a valve seat, a valve member in said third bore, resilient means normally retaining said valve member on its seat to seal the latter, said third bore being in communication with said fluid chamber, said gas chamber wall having an axial bore, a rod slidably mounted at one end in said axial bore in said gas chamber wall, the other end of said rod being slidable in said axial bore in said fluid chamber wall and defining a pump piston and resilient means normally urging said rod to move said pump piston out of its associated axial bore in said fluid chamber wall.

3. The combination recited in claim 2 in which said resilient means is a coil spring encompassing said rod and compressed between said fluid chamber wall and a flange rigid with said rod, the end of said rod mounted in said gas chamber wall being exposed to the contents of said gas chamber.

4. The combination set forth in claim 2 in which the end of the rod in said gas chamber wall has an annular groove and a resilient deformable annular seal is positioned in said annular groove.

References Cited by the Examiner

UNITED STATES PATENTS

| | | | |
|---|---|---|---|
| 2,440,065 | 4/1948 | Ashton | 138—31 |
| 2,683,467 | 7/1954 | Greer | 138—31 |

LAVERNE D. GEIGER, *Primary Examiner.*

EDWARD V. BENHAM, *Examiner.*